United States Patent [19]

Fieldhouse et al.

[11] 4,226,840

[45] Oct. 7, 1980

[54] PROCESS FOR THE POLYMERIZATION OF CYCLIC POLYHALOPHOSPHAZENES USING A CATALYST COMPOSITION OF BORON TRIHALIDE AND OXYGENATED PHOSPHORUS COMPOUNDS

[75] Inventors: John W. Fieldhouse, Mogadore; Daniel F. Graves, Clinton, both of Ohio

[73] Assignee: The Firestone Tire & Rubber Company, Akron, Ohio

[21] Appl. No.: 77,245

[22] Filed: Sep. 19, 1979

[51] Int. Cl.$^3$ ............................................. C01B 25/10
[52] U.S. Cl. .................................................. 423/300
[58] Field of Search ......................................... 423/300

[56] References Cited

U.S. PATENT DOCUMENTS 4,123,503  10/1978  Snyder et al. ........................ 423/300
4,139,598   2/1979  Reynard et al. ...................... 423/300
4,157,425   6/1979  Dieck et al. ......................... 423/300

Primary Examiner—Wayne A. Langel

[57] ABSTRACT

Linear polydihalophosphazene polymers which are substantially free of gel are prepared by thermally polymerizing a cyclic polyhalophosphazene represented by the formula $(NPX_2)_3$, wherein X is fluorine, chlorine or bromine in the presence of a catalyst which comprises the reaction product of a boron trihalide compound with an oxygenated phosphorus compound.

In addition to producing substantially gel free polymers, the catalyst composition of the process of the invention permits improved control of molecular weight, lower polymerization temperature, high rates of conversion of $(NPCl_2)_3$ to $(NPCl_2)_n$ and provides for more readily processible and derivatizable polymers.

11 Claims, No Drawings

PROCESS FOR THE POLYMERIZATION OF CYCLIC POLYHALOPHOSPHAZENES USING A CATALYST COMPOSITION OF BORON TRIHALIDE AND OXYGENATED PHOSPHORUS COMPOUNDS

BACKGROUND OF THE INVENTION

This invention relates to improvements in the polymerization of low molecular weight cyclopolydihalophosphazenes to higher molecular weight linear polydihalophosphazenes. More particularly, the invention relates to the use of a catalyst which comprises the reaction product of trihalides of boron and oxygenated phosphorus compounds in order to improve the polymerization of cyclopolydihalophosphazenes while decreasing or entirely eliminating the formation of gel and by permitting better control of the molecular weight and other physical properties of the resultant polymer.

The polymerization of low molecular weight cyclic polyhalophosphazenes such as $(NPCl_2)_3$ or $(NPCl_2)_4$ to high molecular weight polydihalophosphazene polymer is known in the phosphazene art.

Early polymerization processes involved the uncatalyzed thermal polymerization of such cyclic polydihalophosphazenes utilizing either bulk or batch processes. Such early polymerization processes are described in U.S. Pat. No. 3,370,020 to Allcock et al issued Feb. 20, 1968 and U.S. Pat. No. 3,515,688 to Rose issued June 2, 1970.

While these early polymerization processes provided for the conversion of cyclic polydihalophosphazenes to linear high molecular weight polydihalophosphazene polymer, they exhibited a number of serious disadvantages. Thus, for example, these early processes required relatively high polymerization temperatures, e.g., 200° to 300° C. and lengthy polymerization times (i.e., slow conversion rates). Additionally and more seriously, these processes often resulted in the formation of gelled or partially gelled polymers which were insoluble in conventional solvents and could not readily be derivatized to produce useful polymeric products such as those described in the aforementioned patents. Moreover, control of the molecular weight of the finished polymer was extremely difficult using these early processes.

Recent attempts to overcome or at least minimize the disadvantages inherent in these early processes have involved the investigation of catalyzed polymerization systems. Thus, U.S. Pat. No. 4,005,171 to Reynard et al describes the polymerization of $(NPCl_2)_3$ or $(NPCl_2)_4$ or mixtures thereof using as catalysts metal or organometal salts of very strong acids or strong acids and derivatives of halocyclicphosphazenes; U.S. Pat. No. 4,123,503 to Snyder et al describes the polymerization of $(NPCl_2)_3$ or $(NPCl_2)_4$ or mixtures thereof using Lewis acid type compounds of Al or B such as boron trihalides, alkyl aluminum and alkyl aluminum halides; U.S. Pat. No. 4,137,330 to Prichard et al describes the polymerization of $(NPCl_2)_n$ in which n is from 3 to 9 using an inorganic salt catalyst, preferably a metal halide such as $CrCl_2$, $NiCl_2$, $MgCl_2$ etc.; U.S. Pat. No. 4,110,421 and 4,124,567 to Dieck et al describes the polymerization of $(NPCl_2)_y$ is 3 or 4 or mixtures thereof using as a catalyst a metal alkoxide of the formula $M(OR')_x$ and copending application Ser. No. 898,007 to Snyder et al filed April 20, 1978 commonly assigned to applicants' assignee herein describes the polymerization of $(NPHal_2)_n$ in which Hal is halogen and n is an integer of 3 to 7 using as a catalyst a Ziegler type catalyst such as a compound of Tr, Zr, HF, V etc. with or without a Boron or Aluminum compound as a cocatalyst.

While the above catalyzed polymerization processes are advantageous in many respects, they also exhibit certain disadvantages. Thus, in general, the polymerization processes and catalyst systems described in the aforementioned patents and copending application do not provide the entire spectrum of factors such as relatively low polymerization temperatures, rapid conversion rate, control of molecular weight of the linear polymers and ease of derivatization and processability of linear polymer (e.g., solubility, etc.) which is desirable. Furthermore, many of these processes do not provide the uniformity and consistency of properties desired in the linear polymer.

In contrast, the polymerization process and catalyst composition of the present invention while obviating or greatly minimizing the disadvantages encountered in the early processes provides the desired balance of the above factors and additionally provides uniformity and consistency in the properties of the linear polymer.

SUMMARY OF THE INVENTION

In accordance with this invention, a linear substantially gel free polydihalophosphazene polymer represented by the formula $(NPX_2)_n$, in which X is a halogen selected from fluorine, chlorine and bromine and n is from 20 to 50,000, is prepared. The method of preparation involves the polymerization of a cyclic halophosphazene represented by the formula $(NPX_2)_3$, wherein X is as defined above at a temperature of from 180° to 270° C. in the presence of a catalytically effective amount of a catalyst comprising the reaction product of a Boron compound of the formula $BX_3$ in which X is as defined above with an oxygenated phosphorus compound of the formula

wherein Y and Y' may be the same or different and are selected from the group consisting of F, Cl, Br, R—, RO— and RS—, wherein R is an aryl or substituted aryl group with the proviso that when Y and Y' are the same, not more than two of such R—groups may be aryl or substituted aryl groups.

The process of the invention results in the preparation of a linear substantially gel free polydihalophosphazene polymer which can be readily derivatized and is processible in conventional organic solvents. Moreover, the use of the specified catalyst composition in the process provides an excellent balance of polymerization temperature, rate of conversion and molecular weight control thereby resulting in uniformity and consistency in the properties of the linear polymer.

DETAILED DESCRIPTION OF THE INVENTION

As mentioned heretofore, the process of the invention involves the polymerization of a cyclic halophosphazene represented by the formula $(NPX_2)_3$, in which X is F, Cl or Br at a temperature of 180° C. to 270° C. in the presence of a catalyst or catalyst system which is the product formed by the reaction of a boron trihalide compound with an oxygenated phosphorus compound.

The cyclic halophosphazenes which are suitable for use in the process of the invention are low molecular weight cyclic oligomers represented by the formula $(NPX_2)_3$ in which X is a halogen selected from fluorine, chlorine and bromine. Of those cyclic oligomers, the cyclic dichlorophosphazene trimer $(NPCl_2)_3$ is preferred.

As indicated, the polymerization can be carried out at a relatively low temperature range of 180° to 270° C. However, the preferred temperature range is from 180° C. to 250° C. and the most preferred temperature is 220° C.

The catalyst employed in the process of the invention is as previously indicated the reaction product of a boron trihalide compound and an oxygenated phosphorus compound.

The boron trihalide is a boron compound of the formula $BX_3$ in which X is fluorine, chlorine or bromine. Additionally, the boron trihalide may be a compound containing both the bromine or chlorine ligand, e.g., boron monobromide, dichloride or boron dibromide monochloride. Of these boron trihalides, $BCl_3$ or $BBr_3$ are preferred.

The oxygenated phosphorus compound is a compound represented by the formula

wherein Y and Y' may be the same or different and are selected from the group consisting of F, Cl, Br, R—, RO—, and RS—, wherein R is an aryl or substituted aryl group with the proviso that not more than two of the groups represented by Y and Y' may be R— groups.

As indicated in the above formula, not more than two of the groups represented by Y and Y' may be R— groups as defined above. The reasons for this proviso are apparently related to steric hindrance considerations. Thus, as will be discussed below, the reaction between the boron trihalide compound and the oxygenated phosphorus compound is believed to result in the formation of a complex between these compounds with the boron atom of the boron trihalide being bonded to or at least associated with the oxygen atom of the oxygenated phosphorus compound. As will be evident in such circumstances, the presence of bulky Y and Y' groups attached to the phosphorus atom of the oxygenated phosphorus compound can inhibit or prevent the boron atom of the boron trihalide from approaching closely enough to the phosphorus atom of the oxygenated phosphorus compound to form a complex.

Additionally, as will also be discussed hereinafter, the reaction product or complex formed from the boron trihalide and oxygenated phosphorus compounds must during polymerization also be capable of approaching a nitrogen atom of the cyclic halophosphazene closely enough to affect ring opening of the cyclic compound to form the linear polydihalophosphazene polymer. Thus, the steric effects of the groups represented by Y and Y' both on the formation of the reaction product or complex and the polymerization process must be considered. We have found, for example, that the compound $(C_6H_5)_3P=O$ does not form an effective polymerization catalyst when reacted with $BCl_3$. In contrast, oxygenated phosphorus compounds in which the groups represented by Y and Y' may all be halogen or RO— or RS— groups do form effective catalysts when reacted with boron trihalides. In the case of RO— and RS— groups, it was somewhat surprising that steric hindrance effects were absent. However, it is believed that this is due to the fact that the bulky aryl groups are spaced far enough away from the phosphorus atom that the groups will bend sufficiently to permit sufficient approach of the boron atom to the oxygen atom. In any event, the determination of suitable Y and Y' groups which will not sterically hinder the reaction between the oxygenated phosphorus compound and boron trihalide compound is well within the skill of those active in the polymerization arts and can be determined by simple experimentation.

As indicated, the reaction between the boron trihalide, $BX_3$ and oxygenated phosphorus compound (Y)-(Y')$_2$P=O is believed to result in the formation of a complex. Thus, the formation of complexes formed from the interaction of boron trihalides with oxygenated phosphorus compounds is documented in the article entitled "Interaction of Boron Trihalides with Aryl Phosphates and Phosphorochloridates" by M. J. Frazer, W. Gerrard and J. K. Patel appearing in Journal of Chemical Society (1960) pages 726–730, the disclosure of which is incorporated herein by reference.

The article describes the preparation of products formed by the interaction of boron trihalides (e.g., $BX_3$) with aryl phosphates [i.e., $(RO)_3P=O$] or phosphorochloridates [e.g., $(C_6H_5)(Cl)_2P=O$]. The process apparently involves reacting the boron compound and phosphorus compound in a suitable solvent at a temperature of −80° C. The article describes the resultant products as complexes and suggests that the formula of the complex formed from boron trihalide and aryl phosphate is $(RO)_3P^{(+)}=O-^{(-)}BX_3$.

The catalytic reaction products of the process of this invention are prepared by a slightly different process than described in the aforementioned article. Thus, these reaction products are prepared by (a) the interaction of the boron trihalide compound and the oxygenated phosphorus compound in a suitable solvent which solvates the reactants (i.e., $BCl_3$ and YY'Y'P=O) at a temperature of from 40° to 60° C.; but is a non-solvent for the product complex; (b) the interaction of a molten bulk oxygenated phosphorus compound with gaseous boron trihalide. The resultant reaction product is believed to be a complex represented by any of the formulas:

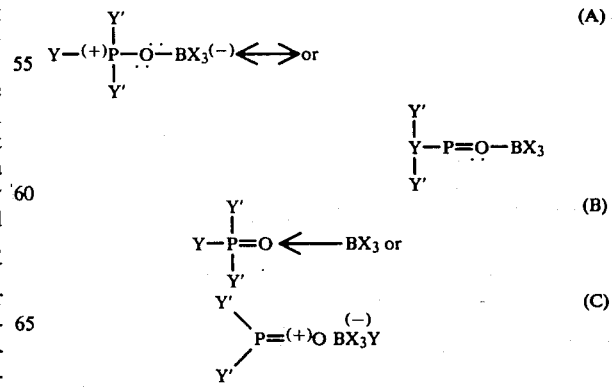

These reaction products may also be mixtures of the foregoing complexes.

As indicated, the catalyst or catalyst systems employed in the process of the invention are the reaction products or complexes of oxygenated phosphorus compounds represented by the formula

with boron trihalides represented by the formula $BX_3$ wherein Y, Y' and X are as defined above.

A wide variety of oxygenated phosphorus compounds may be utilized in forming the catalyst bearing in mind the steric hindrance considerations discussed above; thus, suitable oxygenated phosphorus compounds include triaryl phosphates represented by the formula $(RO)_3P=O$ in which R is aryl or substituted aryl. Illustrative examples of such triaryl phosphates include tri-phenyl phosphate; tri-m-tolyl phosphate; tri-alkylphenyl phosphates such as tri-p,m,o-methylphenyl phosphate, tri-p,m,o-ethylphenyl phosphate, tri-p,m,o-propylphenyl phosphate, tri-p,m,o-n-butylphenyl phosphate, tri-p-t-butylphenyl phosphate and the like; alkaryl-diaryl phosphates such as p-methylphenyl-diphenyl phosphate, p-ethylphenyl-diphenyl phosphate and the like and tri-halogen substituted phenyl phosphates such as p,m,o-fluoro-, chloro- and bromo-phenyl phosphates. Additional oxygenated phosphorus compounds which may be employed include phosphoryl halides in which the halogen is fluorine, chlorine or bromine and compounds such as phenyl dichlorophosphate, phenylphosphonic dichloride, diphenyl chlorophosphate triphenylthiophosphate and the like.

As mentioned heretofore the catalysts of the process of the invention which are reaction products or complexes of oxygenated phosphorus compounds and boron trihalides provide greatly improved polymerization of cyclic halophosphazene trimer to linear polydihalophosphazene polymer at lower temperatures, provide greater control of molecular weight and produce polymers which exhibit more uniform and consistent properties and are more readily derivatizable and processible in conventional organic solvents.

At this time, it should be noted that boron trihalides alone produce catalytic effects as illustrated in U.S. Pat. No. 4,123,503 described above. However, the oxygenated phosphorus compounds when used alone exhibit no catalytic effects. It is therefore surprising that the reaction products or complexes of such oxygenated phosphorus compounds with boron trihalides result in the formation of a catalyst or catalyst systems which provides improved results over boron trihalides alone.

The exact mechanism by which these reaction products or complexes promote the polymerization of the cyclic halophosphazene oligomers is not known with certainty. However, while not wishing to be bound by any particular theory, the following polymerization mechanism utilizing a catalyst complex of triphenyl phosphate-boron trichloride is suggested:

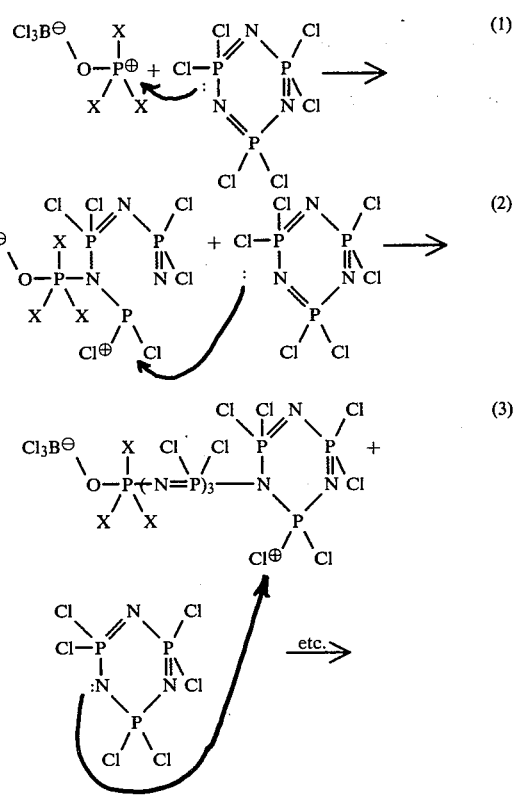

As indicated in the above reaction scheme, the reaction product or complex of triphenyl phosphate and boron trichloride results in the formation of a product in which the phosphorus atom is positively charged. Thus, the catalyst of the process of the invention promotes polymerization of the cyclic oligomer by a cationic polymerization mechanism.

The following examples are submitted for the purpose of further illustrating the nature of the invention and are not intended as a limitation on the scope thereof. Parts and percentages referred to in the Examples are by weight unless otherwise indicated.

Example A which follows illustrates the typical procedure for preparing the catalyst component of the invention.

EXAMPLE A

In this example, triphenyl phosphate $[(C_6H_5O)_3P=O]$ was reacted with boron trichloride $(BCl_3)$ utilizing the following procedure:

Into a 5-liter single-necked pyrex flask was charged 245.3 grams (0.75 mole) of triphenyl phosphate and 2000 grams of cyclohexane. The charged mixture was slowly heated to 45°-55° C. until all of the triphenyl phosphate had dissolved. Then, a rubber septum was attached to the joint of the flask and 87.8 grams (0.75 mole) of gaseous boron trichloride was slowly pressured into the flask with shaking and stirring until the theoretical amount of gas was absorbed and reacted. At this time, a pale yellow liquid formed and began to slowly crystallize. After continued agitation and slow cooling, the product completely crystallized. The cyclohexane was removed from the flask by vacuum evaporation. The resultant product, a dry powder, weighed 320.0 grams which amounted to 96% theoretical reaction product.

Examples B and C which follow illustrate another procedure for preparing the catalyst component of the invention which does not utilize any solvent.

EXAMPLE B

Commercial triphenyl phosphate, 193 g (0.59 m) was placed in a dry 28 oz. pop bottle and heated at 160° C./0.10 in mmHg. for 20 hours. There was a weight loss of 0.04 g. The bottle was cooled to 75°–100° C. and gaseous $BCl_3$, 69.5 g (0.59 m) was added over a 60 minute period, during which time a slight exotherm occurred. As the majority of $BCl_3$ was added, the complex began to crystallize. After 69.5 g of boron trichloride had been added, most of the contents of the bottle had crystallized.

EXAMPLE C

The same procedure was used in this example as described above in Example B except that the vacuum-heat treatment of the triphenyl phosphate was not employed. Identical preparative results were obtained in this manner.

EXAMPLES 1–11

In these examples, hexachlorocyclotriphosphazene $(NPCl_2)_3$ was polymerized using the triphenylphosphate-boron trichloride reaction product of Example A as a catalyst. In the examples, different lots of $(NPCl_2)_3$ were employed. A control polymerization was also conducted in which $(NPCl_2)_3$ was polymerized without catalyst.

The general procedure used in evaluating the activity of the catalyst was as follows:

To a series of dried pyrex tubes each having a total volume of 35 ml. was charged 30.0 grams (258 millimoles) of $(NPCl_2)_3$ to each tube along with various levels of the triphenyl phosphate-boron trichloride reaction product of Example A, (as indicated, different lots of $(NPCl_2)_3$ were also employed in the evaluation). The tubes were then evacuated to 0.05 to 0.1 mm Hg and sealed. The tubes were heated to 220° C. for various lengths of time. Following the heating procedure, the tubes were opened in a drybox (helium atmosphere) and the contents dissolved in toluene or cyclohexane. Hexane or heptane was then added to precipitate the linear polydichlorophosphazene polymer. The polymer was then redissolved in cyclohexane and viscosity measurements (DSV) were made. Table I shows the polymerization conditions and results of this evaluation.

TABLE I

| Ex. No. | Catalyst* amount (mM) | Polymerization at 220° C. Time/Hrs. | % Conversion | Polymer Viscosity (DSV** in Cyclohexane) | $(NPCl_2)_3$ Lot Designation |
|---|---|---|---|---|---|
| Control | 0.00 | 20 | 1.4 | — | — |
| 1 | 6.75 | 17 | 78 | 0.05 | A |
| 2 | 2.25 | 48 | 99–100 | 0.06 | " |
| 3 | 0.15 | 10 | 70 | 0.50 | " |
| 4 | 0.11 | 10 | 37 | 0.76 | " |
| 5 | 0.06 | 4 | 32 | 1.26 | " |
| 6 | 0.11 | 4.5 | 28 | 0.92 | B |
| 7 | 0.11 | 10 | 53 | 0.97 | " |
| 8 | 0.11 | 18 | 55 | 0.93 | " |
| 9 | 0.13 | 21 | 56 | 0.65 | C |
| 10 | 0.27 | 21 | 52 | 0.47 | " |
| 11 | 0.11 | 16 | 83 | 1.02 | D |

*Catalyst of Example A which is the reaction product of triphenyl phosphate with boron trichloride. Amounts are in millimoles.
**DSV is dilute solution viscosity.

The above data illustrates a number of important facts. Thus, the polymerization of $(NPCl_2)_3$ in the absence of catalyst (control) results in very little conversion.

Examples 1–5 show polymerization of trimer $(NPCl_2)_3$ from a lot designated A utilizing a constant temperature by varying the amounts of catalyst and polymerization time. As can be seen from the data, the percent conversion and viscosity are both affected by these factors indicating that the reaction product of Example A does initiate polymerization resulting in polydichlorophosphazene of increasing molecular weight with decreasing amount of catalyst.

(Examples 6–8) show polymerization of trimer from a lot designated B utilizing a constant temperature and constant amounts of catalyst but varying the polymerization time. As the data shows, the DSV of the polydichlorophosphazene polymer which is related to the molecular weight does not change with increasing conversion or time and moreover is relatively consistent and reproducible.

In addition, there is a small difference in DSV (hence molecular weight) between catalytic polymerization when different lots of trimer are employed as evidenced by the DSV in Example 4 which used trimer of lot A and the DSV of Examples 6–8. However, this difference in DSV and hence molecular weight is minor, i.e., DSV of Example 4 is 0.76 while those of Examples 6–8 range from 0.92 to 0.96. Moreover, the difference in DSV's between different lots of trimer utilizing the catalyst of these examples is much less than is obtained with prior catalysts. The reason for this minor variation in DSV from batch to batch is not totally understood but probably involves minute quantities of unknown impurities in the trimer which affect the catalyst. This is illustrated by Example 11 in which a trimer from a lot designated D was purified using well known sublimation procedures and then catalyzed using the catalyst herein at the same level as in Examples 4 and 6–8. As shown, the DSV is higher in Example 11 (i.e., 1.02) but closer to the values obtained in Examples 6–8.

Moreover, upon doubling the catalyst level used in Example 9, the expected reduction of DSV in Example 10 is observed. This illustrates excellent molecular weight control.

The polymers obtained in the above examples using a catalyst of the invention are readily soluble in conventional solvents employed in the polyphosphazene art.

The following example (i.e., Ex. 12) illustrates the catalytic effect of the reaction product or complex of a phosphoryl halide with a boron trihalide in the polymerization of $(NPCl_2)_3$ trimer.

EXAMPLE 12

In this example, a catalyst was prepared by reacting phosphorus oxychloride $(POCl_3)$ with boron trichloride at a molar ratio of 1:1 using substantially the same procedure as described in Example A.

The polymerization evaluation was conducted in basically the same manner as described in Examples 1–11 except that a stainless steel reactor was used instead of a glass tube and the polymerization was carried out at 200° C. Test conditions and results are shown in Table II.

TABLE II

| Catalyst: | $Cl_3P=O—BCl_3$ |
|---|---|
| Catalyst: | |

| Trimer Ratio | 0.366 mM/30 grams $(NPCl_2)_3$ |
|---|---|
| Polymerization Temp.: | 200° C. |

Polymerization Rate:

| Time (hrs.) | % Conversion | Conversion/hr. |
|---|---|---|
| 2 | 13.1 | 6.55 |
| 10 | 46.2 | 4.14 |
| 18 | 65.6 | 2.43 |

DSV = 0.69

The following Examples 13–29 illustrate the catalysis effect of various reaction products of oxygenated phosphorus compounds with boron trihalide compounds on the polymerization of $(NPCl_2)_3$ trimer.

EXAMPLES 13–29

In these examples, the catalysts were prepared by reacting the various oxygenated phosphorus compounds with boron trichloride at a 1:1 molar ratio using basically the same procedure utilized in Example A. The effect of the resultant catalysts on the polymerization of $(NPCl_2)_3$ was then evaluated using substantially the same procedure employed in Examples 1–11. Catalyst types, amounts, polymerization conditions and test results are shown in Table III.

TABLE III

| | Catalyst | | Polymerization 220° C. | % Con- | |
|---|---|---|---|---|---|
| Ex. No. | Type | Amt. (mM) | Time (hrs.) | version | DSV |
| 13 | $POCl_3BCl_3$ | 0.09 | 24 | 42.5 | 0.77 |
| 14 | " | 0.37 | 22 | 32.5 | 0.72 |
| 15 | " | 0.74 | 20 | 56.7 | 0.80 |
| 16 | " | 5.50 | 30 | 80–90 | 0.05 |
| 17 | $C_6H_5O—P(Cl)(Cl)=O \leftarrow BCl_3$ | 4.0 | 38 | — | 0.09 |
| 18 | $C_6H_5—P(Cl)(Cl)=O \leftarrow BCl_3$ | 0.2 | 30 | 73 | 0.11 |
| 19 | " | 0.5 | 46 | 96 | 0.08 |
| 20 | " | 0.6 | 20 | 42 | 0.07 |
| 21 | " | 3.2 | 30 | 85 | 0.05 |
| 22 | $(C_6H_5O)_3P=O \leftarrow BCl_3$ | 0.11 | 4 | 33 | 0.82 |
| 23 | " | 0.18 | 18 | 86 | 0.41 |
| 24 | " | 0.77 | 12 | 66 | 0.23 |
| 25 | " | 1.50 | 18 | 79 | 0.13 |
| 26 | $(p-ClC_6H_5O)_3P=O \leftarrow BCl_3$ | 0.55 | 32 | 76.8 | 0.19 |
| 27 | $[(CH_3)_3C—C_6H_4O]_3P=O \leftarrow BCl_3$ | 0.60 | 24 | 50 | 0.45 |
| 28 | $(C_6H_5S)_3P=O \leftarrow BCl_3$ | 0.60 | 24 | (50)* | (0.5)* |
| 29 | $(p-CH_3C_6H_4O)(C_6H_5O)_2P=O \leftarrow BCl_3$ | 2.2 | 28 | 96 | 0.05 |

*Indicates a visual estimate of conversion and viscosity

The following examples (i.e., Examples 30–38) illustrate the catalytic effect of additional reaction products of oxygenated phosphorus compounds with boron trihalide compounds on the polymerization of $(NPCl_2)_3$.

EXAMPLES 30–38

In these examples, the catalysts were prepared by reacting various oxygenated phosphorus compounds with various boron trihalides at a 1:1 molar ratio using basically the same procedure as described in Example A. The effect of the resultant catalysts on the polymerization of $(NPCl_2)_3$ was then evaluated using substantially the same procedure employed in Examples 1–11. Catalyst types, amounts, polymerization conditions and test results are shown in Table IV.

TABLE IV

| Ex. No. | $(NPCl_2)_3$ | Cat. | g. cat. | Hrs. | Temp. °C. | % Conv. | DSV/Sol. |
|---|---|---|---|---|---|---|---|
| 30 | 30 | $CH_3—C_6H_4—P(=O)(O\phi)_2 \leftarrow BCl_3$ | 1.00 | 28 | 220 | 97.7 | 0.05/CH |

TABLE IV-continued

| Ex. No. | (NPCl₂)₃ | Cat. | g. cat. | Hrs. | Temp. °C. | % Conv. | DSV/Sol. |
|---|---|---|---|---|---|---|---|
| 31 | 30 | φ—P(=O)(Oφ)₂ ← BCl₃ | 0.05 | 41 | 220 | 94.0 | 0.52/Tol |
| 32 | 200 | φ—P(=O)(Oφ)₂ ← BCl₃ | 6.40 | 8 | 220 | 36.8 | 0.06/Tol |
| 33 | 30 | (φO)₃P=O ← BBr₃ | 0.10 | 24 | 220 | 95 | 0.31/Tol |
| 34 | 30 | " | 0.05 | 40 | 220 | 61.8 | 0.54/Tol |
| 35 | 30 | (φO)₃P=O ← BF₃ | 0.10 | 36 | 220 | 90 | 0.30/CH |
| 36 | 30 | Br₃P=O ← BCl₃ | 0.10 | 24 | 220 | 89.6 | 0.47/Tol |
| 37 | 30 | (φO)₃P=O ← BF₃ | 1.00 | 24 | 220 | 48.0 | 0.08/Tol |
| 38 | 30 | (CH₃—C₆H₄—O)₃P=O ← BCl₃ | 11 | 16 | 220 | 89.5 | 0.62/Tol |

Sol = solvent
φ - phenyl (C₆H₅)
CH = Cyclohexane
Tol = toluene

EXAMPLE 39

Following the procedure of examples 1-11, (NPCl₂)₃ was polymerized using the triphenylphosphate-boron trichloride complex as prepared in Example B. Thus, 30 g of (NPCl₂)₃ with 0.08 g of the complex prepared in Example B was heated at 220° C. for 6.5 hours giving 40% conversion to (NPCl₂)ₙ with a DSV=0.98 in toluene. This is comparable to the 32 and 35% conversions and DSV's of 1.26 and 0.76 (in cyclohexane) obtained in Examples 4 and 5 using 0.06 and 0.11 g of triphenylphosphate-boron trichloride complex prepared according to Example A.

EXAMPLE 40

Following the procedure of examples 1-11, (NPCl₂)₃ was polymerized using the triphenylphosphate-boron trichloride complex prepared in Example C. Thus, 30 g of (NPCl₂)₃ with 0.08 g of the complex prepared in Example B was heated at 220° C. for 6.5 hours giving 45% conversion to (NPCl₂)ₙ with a DSV=0.92 in toluene. As mentioned in Example 39, these results are similar to those obtained using catalyst complex as prepared in Example A.

The following examples (i.e., 41-44) illustrate the advantage of using the triphenylphosphate-boron trichloride complex rather than boron trichloride alone. Procedures were used similar to those described in examples 1-11.

phosphate-boron trichloride complex, entirely different results were obtained. Using BCl₃ alone (Example 41) polymerization of trimer to insoluble, gelled polymer resulted. Using the triphenylphosphate-boron trichloride complex (Ex. 42), a high yield of soluble, gel-free polymer was obtained. In a similar manner using a five fold molar increase in BCl₃ (Ex. 43), only insoluble, gelled polymer was formed, whereas using a five fold molar increase in the triphenylphosphate-boron trichloride complex (Ex. 44) a soluble, gel-free polymer was obtained which showed a corresponding decrease in molecular weight as evidenced by a reduction in viscosity.

Table V thus shows the advantages of using triphenylphosphate-boron trichloride rather than boron trichloride alone as a catalyst for the polymerization of chlorotrimer to chloropolymer.

The following examples (i.e., 45-48) illustrate the broad range of polymerization temperatures which may be employed in the process of the invention.

EXAMPLES 45-48

In these examples, (NPCl₂)₃ was polymerized at various temperatures utilizing a triphenylphosphate-boron trichloride catalyst prepared in accordance with the procedure of Example A. The polymerization evaluation was conducted using substantially the same procedure employed in Examples 1-11. Catalyst amounts, polymerization temperatures and test results are shown in Table VI.

TABLE V

| Ex. No. | g.(NPCl₂)₃ | Cat. | g cat. | mM cat. | Hrs. | Temp. °C. | % Conv. | DSV Sol. |
|---|---|---|---|---|---|---|---|---|
| 41 | 30 | BCl₃ | .028 | .222 | 16 | 220 | 62.7 | GEL |
| 42 | 30 | (φ—O)₃P=O←BCl₃ | 0.10g | .222 | 16 | 220 | 79.8 | 0.45 |
| 43 | 30 | BCl₃ | 0.14 | 1.1 | 16 | 220 | 95.5 | GEL |
| 44 | 30 | (φ—O)₃P=O←BCl₃ | 0.49 | 1.1 | 16 | 220 | 88.0 | 0.25 |

As shown in Table V (Ex. Nos. 42 and 44) using equimolar quantities of boron trichloride and triphenyl-

TABLE VI

| Ex. No. | g(NPCl$_2$)$_3$ | Cat. | g cat. | Temp. °C. | Hrs. | % Conv. | DSV/Sol |
|---|---|---|---|---|---|---|---|
| 45 | 30.0 | ($\phi$—O)$_3$P=O←BCl$_3$ | 0.10 | 180 | 64 | 64 | 0.52/tol. |
| 46 | 30.0 | " | 0.10 | 220 | 16 | 80 | 0.45/Tol. |
| 47 | 30.0 | " | 0.10 | 250 | 7 | 88.9 | 0.63/Tol. |
| 48 | 30.0 | " | 0.05 | 270 | 3 | 62 | 0.58/Tol. |

We claim:

1. A method of preparing a substantially gel free linear polydihalophosphazene polymer represented by the formula (NPX$_2$)$_n$ in which X is a halogen selected from the group consisting of F, Cl and Br and n is from 20 to 50,000; said method comprising polymerizing a cyclohalophosphazene represented by the formula (NPX$_2$)$_3$ in which X is as defined above at a temperature of from 180° to 270° C. in the presence of a catalytically effective amount of a catalyst which comprises the reaction product of a boron compound of the formula BX$_3$ in which X is F, Cl or Br with an oxygenated phosphorus compound of the formula

wherein Y and Y' may be the same or different and are selected from the group consisting of F, Cl, Br, R—, RO— and RS—, wherein R is an aryl or substituted aryl group with the proviso that not more than two of the groups represented by Y and Y' may be R— groups.

2. The method of claim 1 wherein said boron compound is BCl$_3$.
3. The method of claim 1 wherein said oxygenated phosphorus compound is Cl$_3$P=O.
4. The method of claim 1 wherein said catalyst is the reaction product of BCl$_3$ and Cl$_3$P=O.
5. The method of claim 1 wherein said catalyst is the reaction product of BCl$_3$ and (C$_6$H$_5$O)$_3$P=O.
6. The method of claim 1 wherein said catalyst is the reaction product of BCl$_3$ and (C$_6$H$_5$O)(Cl)$_2$P=O.
7. The method of claim 1 wherein said catalyst is the reaction product of BCl$_3$ and (C$_6$H$_5$)(Cl)$_2$P=O.
8. The method of claim 1 wherein said catalyst is the reaction product of BCl$_3$ and (p-ClC$_6$H$_4$O)$_3$P=O.
9. The method of claim 1 wherein said catalyst is the reaction product of BCl$_3$ and [p—(CH$_3$)$_3$—C—C$_6$H$_4$O]$_3$P=O.
10. The method of claim 1 wherein said catalyst is the reaction product of BCl$_3$ and (C$_6$H$_5$S)$_3$P=O.
11. The method of claim 1 wherein said catalyst is the reaction product of BCl$_3$ and (p—CH$_3$C$_6$H$_4$O)(C$_6$H$_5$O)$_2$P=O.

* * * * *

UNITED STATES PATENT AND TRADEMARK OFFICE
CERTIFICATE OF CORRECTION

PATENT NO. : 4,226,840
DATED : October 7, 1980
INVENTOR(S) : John W. Fieldhouse and Daniel F. Graves It is certified that error appears in the above-identified patent and that said Letters Patent are hereby corrected as shown below:

Column 12, Table IV-continued under the heading "g. cat." delete the last figure "11" in the column and insert instead -- .11 --

Signed and Sealed this

Thirteenth Day of January 1981

[SEAL]

Attest:

Attesting Officer

SIDNEY A. DIAMOND

Commissioner of Patents and Trademarks